Jan. 3, 1967 P. EISLER 3,296,415
ELECTRICALLY HEATED DISPENSABLE CONTAINER
Filed Aug. 12, 1963 9 Sheets-Sheet 1

Inventor
Paul Eisler
By G. Emery Atty.

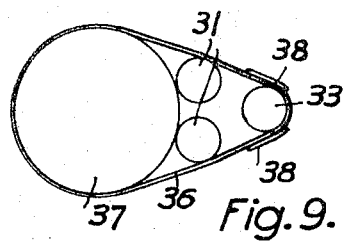
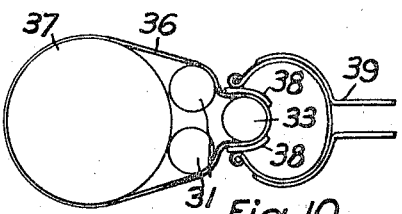
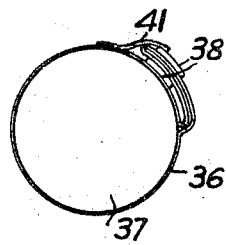
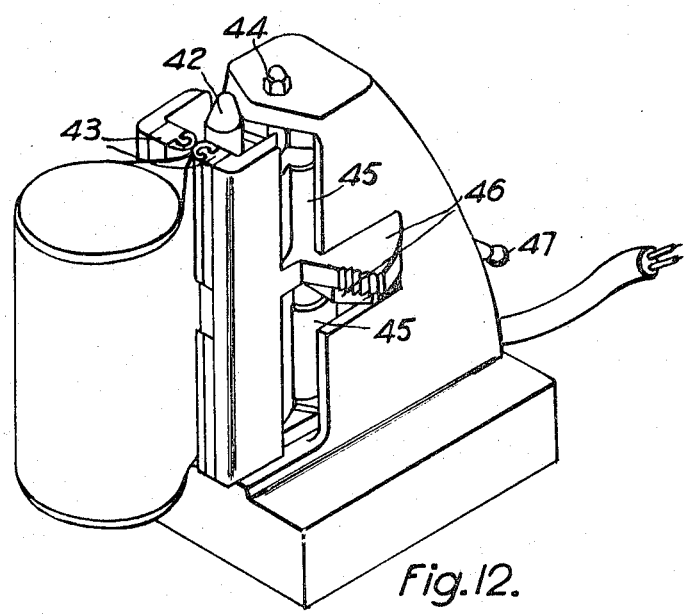
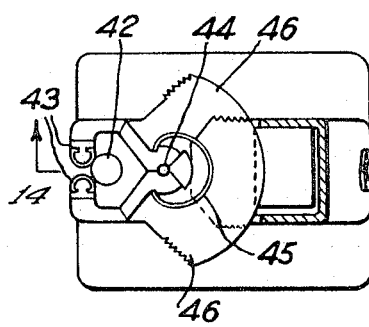
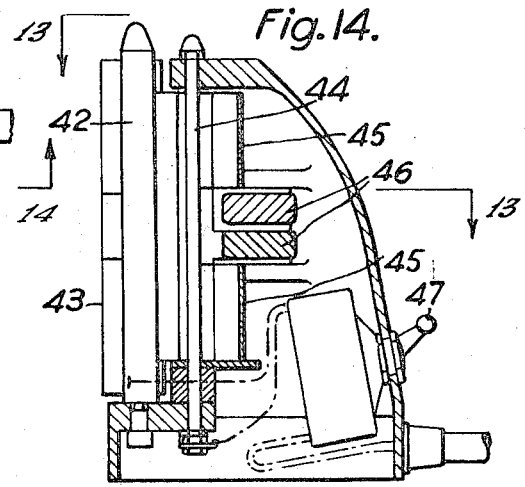
Inventor
Paul Eisler

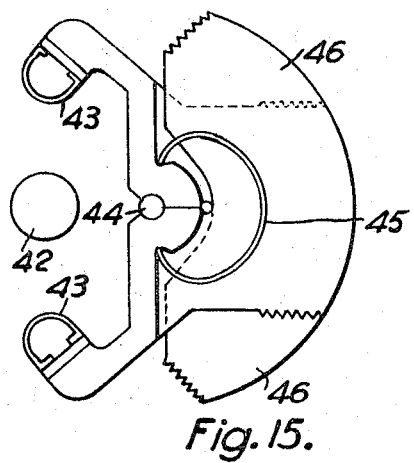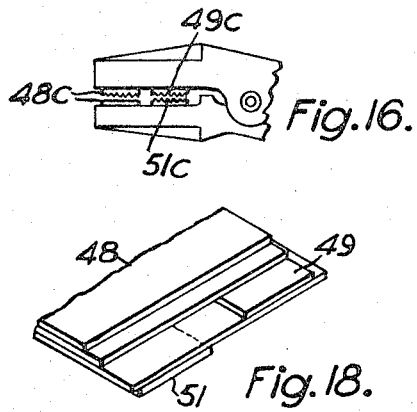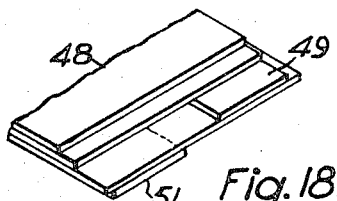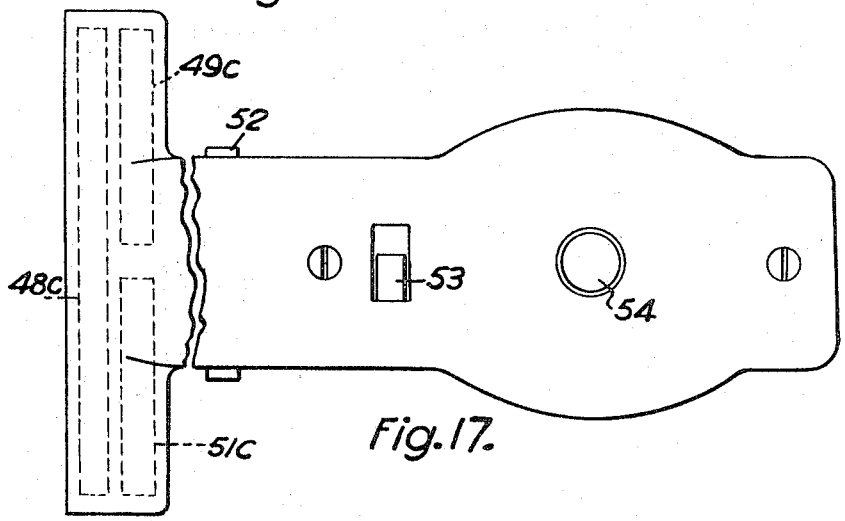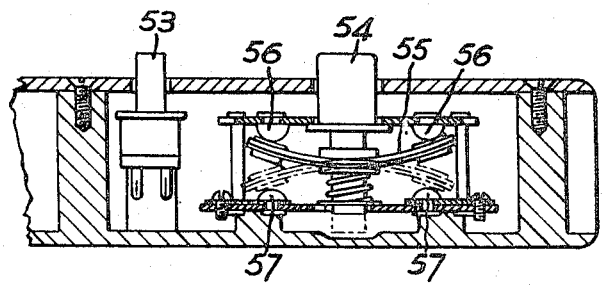

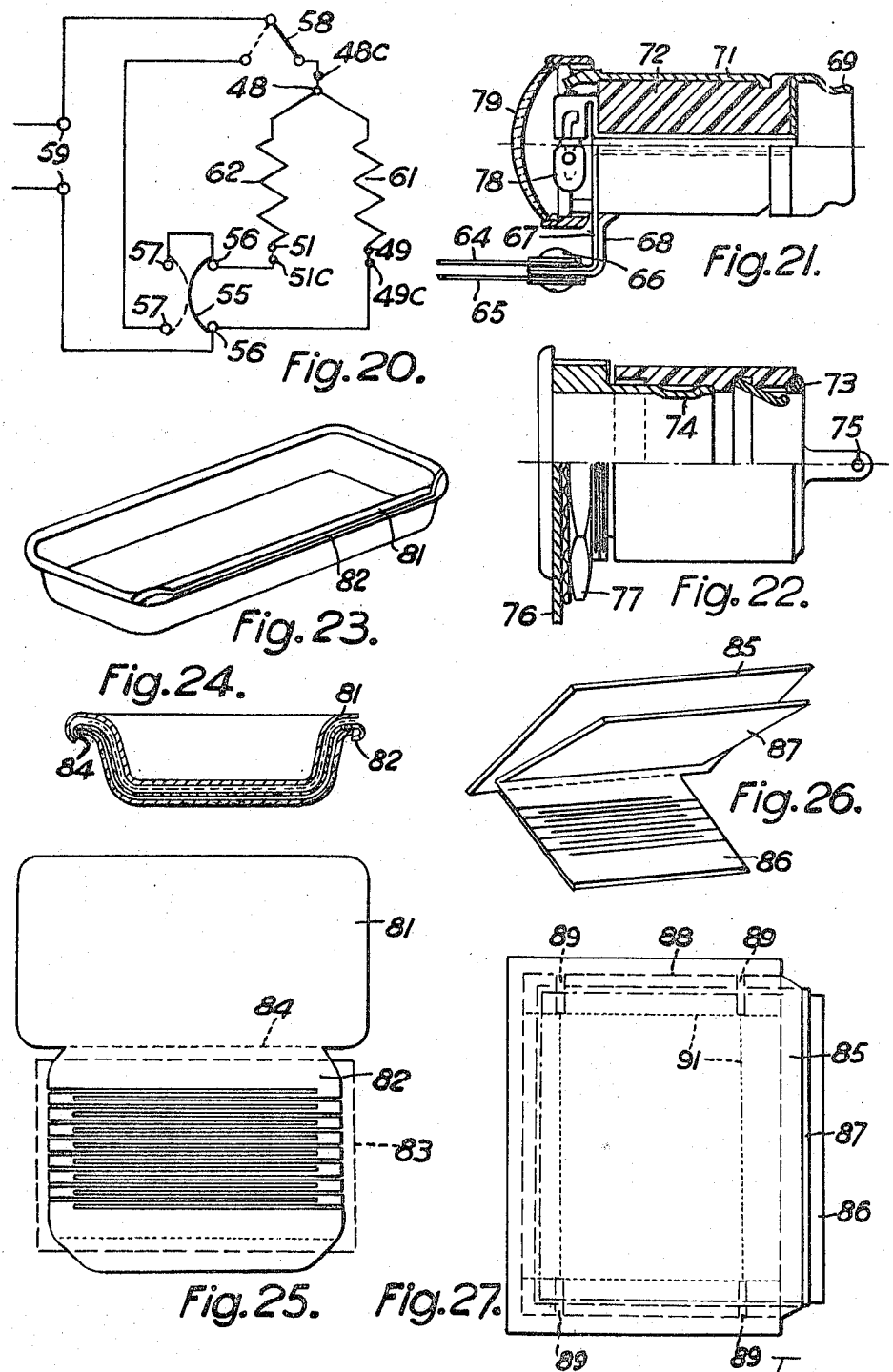

Jan. 3, 1967   P. EISLER   3,296,415
ELECTRICALLY HEATED DISPENSABLE CONTAINER
Filed Aug. 12, 1963   9 Sheets-Sheet 5

Inventor
Paul Eisler
By
G. Emery Atty.

Jan. 3, 1967    P. EISLER    3,296,415
ELECTRICALLY HEATED DISPENSABLE CONTAINER
Filed Aug. 12, 1963    9 Sheets-Sheet 6

Inventor
Paul Eisler
By G. Emery Atty.

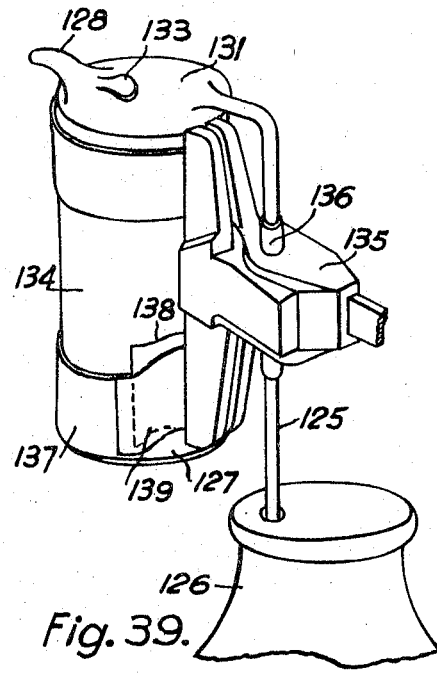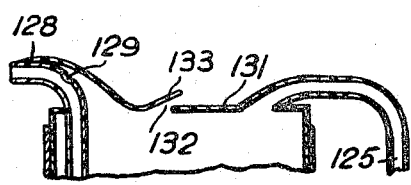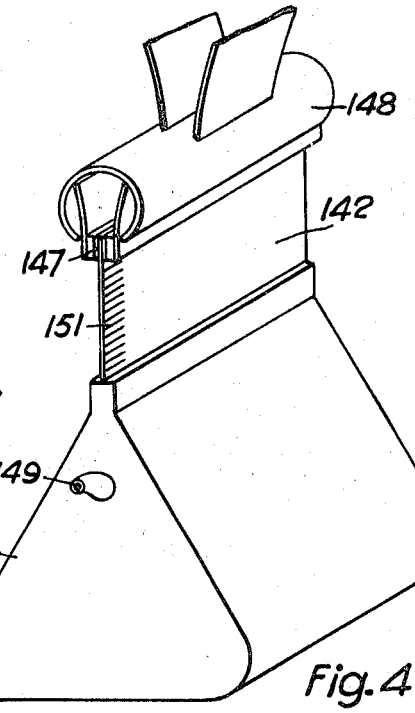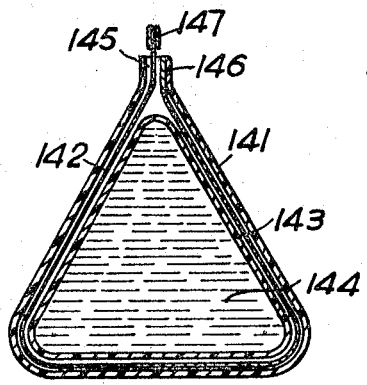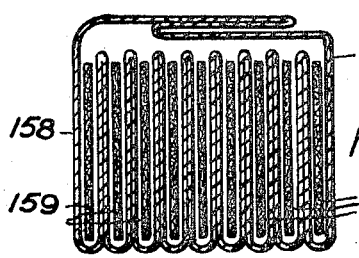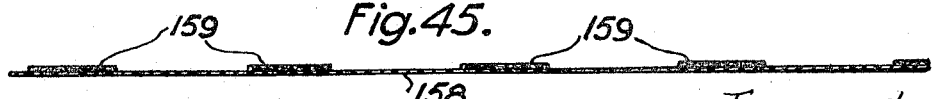

Jan. 3, 1967  P. EISLER  3,296,415
ELECTRICALLY HEATED DISPENSABLE CONTAINER
Filed Aug. 12, 1963  9 Sheets-Sheet 9

Inventor
Paul Eisler
By G. Emery Atty.

United States Patent Office 3,296,415
Patented Jan. 3, 1967

3,296,415
ELECTRICALLY HEATED DISPENSABLE
CONTAINER
Paul Eisler, 57 Exeter Road, London, England
Filed Aug. 12, 1963, Ser. No. 301,488
6 Claims. (Cl. 219—385)

The present invention is a continuation-in-part of my application Serial No. 749,554, filed July 18, 1958, for Surface Heating Device, now Patent No. 3,100,711, issued August 13, 1963.

The invention relates to the heating of substances contained in packages of relatively small size. Foodstuffs in single or multi-portions for immediate consumption are a convenient example illustrative both of the order of size and the kind of substance but the invention is not restricted to this example and can be applied to many other substances which it may be desirable or necessary to heat in the package, as for example, adhesives, coating materials, synthetic resins and similar thermosetting or thermoplastic materials, greases and chemicals. Hereinafter foodstuffs will generally be referred to for convenience.

The present invention provides for a substance to be heated while contained in a dispensable container to which end the substance is in contact with at least part of the inside surface of the container and a thin heating film is incorporated in the wall of the container, this film having a surface pattern presenting a resistive electrical path between a least two terminals to which access can be obtained for connection to a supply without removing the substance from the container. Thus by making connection of the terminals to a supply having a voltage appropriate to the resistance of the path heat can be generated in the film by which the substance can be heated. It is to be noted that since the substance is in contact with at least part of the inside surface of the container and since the heating film is incorporated in the wall of the container, at least some of the heat will be transmitted from the film to the substance by conduction. An object of the present invention is to enable such an arrangement to be used to heat the substance rapidly without any risk of hot spots in the conductive pattern which might damage the material, damage the pattern or have other undesirable results.

If it could be ensured that the whole conductive pattern were in intimate contact with the substance so that direct conduction of heat into the substance took place, the temperature gradient would be small, there would be no local hot spots and the permissible rate of heating would be limited essentially only by the conductivity of the substance and the time necessary for the substance to reach the required temperature. In practice however the conductive pattern usually cannot be allowed to come into direct contact with the substance because such contact may be undesirable for electrical reasons or on account of the nature of the substance and material of the pattern, for reasons of packaging, use or processing or storing of the substance, etc. There will usually therefore be at least one thin layer of material between the pattern and the substance to insulate the former and protect the latter; there may be more than one such layer as will appear later. Also it may be necessary for the pattern of the film to extend to parts of the container which are not or may not remain in direct contact on their external surfaces with the substances or even extend outside the container altogether, so that from these parts of the film heat can be dissipated only by radiation or possibly by radiation with some convection. Shortly stated therefore the dissipation of heat from the film in general will not be a simple function only of its area, and there will be a serious risk of local hot spots if a uniformly distributed resistive pattern is uniformly supplied with current without consideration of any differentiation required by the particular conductive heat transfer into the substance.

According to the present invention the problem thus presented is solved by dimensioning the pattern so that in operation in addition to the dissipation by connection no part of the pattern has to dissipate more than 4 watts per square inch, or in other words when the pattern is connected to a supply of the appropriate predetermined voltage the difference between the heat conducted into the substance in the container from any area of the surface of the heating film and the wattage supplied to said area is less than 4 watts per square inch of said area. While such a difference may not be critical in any absolute sense, extensive investigations have shown that under such conditions rapid heating by a dispensable heating film without hot spots or damage becomes possible.

Depending on the manner in which the substance and the film are disposed in relation to one another during operation and the disposition in relation to one another during operation and the disposition of layers which come between the actual conductive pattern and the substance itself it may be possible to use a film the loading of which is uniformly distributed over the whole patterned area, or it may be necessary to vary the loading in different parts of the film.

It may here be mentioned that for the purposes of this specification and in the claims dispensable containers means not that the container has to be dispensed with for technical reasons such as destruction being necessary for access to the contents but that it is economically dispensable. Generally speaking food and many other substances are packaged in containers the cost of which in comparison with the cost of their contents makes it economically feasible to dispense with them once opened, a highly desirable possibility from the hygienic point of view at least in the case of food. The films used in the present invention can also be produced sufficiently cheaply to enable them to be dispensed with, and their nature will generally be such that their cost will be lower than the cost of collecting, cleaning and reconditioning (e.g. sterilizing) and reassembly with other parts of the package so that there will be no incentive to attempt their recovery which would generally be undesirable at least in the case of food.

As will be shown they may be made of materials such as metallic foils which are commonly used in packaging, sometimes with the addition of such material as carbon e.g. graphite which in the quality and quantity required is also very cheap.

Desirably the films are designed to be operated on a low voltage which is not dangerous to human contact generally below 50 volts and preferably a good deal below 50 volts. This not only avoids danger, but considerably cheapens the film by avoiding the need for high class insulation. The low voltage may advantageously be the same as that of the usual motor car battery, namely 12 volts. Voltages of this order enable meander patterns of very convenient dimensions to be used in practising the invention.

The invention will be further described with reference to the accompanying drawings. The drawings are diagrammatic and in particular where the heating film or other material is shown in section in most cases thicknesses are much exaggerated.

FIGURE 7 is a side view of the parts broken away of another connecting device for applying the tension to the heating film.

FIGURES 8, 9 and 10 illustrate stages in the use of the device of FIGURE 7.

FIGURE 11 illustrates the form of the film used in the device of FIGURE 7 prior to use.

FIGURE 12 is a perspective view of another connecting device for applying tension to the heating film.

FIGURE 13 is a cross section and

FIGURE 14 a vertical section of FIGURE 12.

FIGURE 15 is a detail cross section with the jaws of the device open.

FIGURE 16 is a detail side view and

FIGURE 17 is a plan view of another clip device making connection to a heating film.

FIGURE 18 illustrates the terminals of the film for which the device of FIGURES 16 and 17 is designed.

FIGURE 19 is a detail longitudinal section of FIGURE 17.

FIGURE 20 shows a circuit using the device of FIGURES 16 to 19.

FIGURE 21 is a longitudinal section of a plug and

FIGURE 22 is a longitudinal section of a socket for making connection to a clip device for connection to the heating film.

FIGURE 23 is a perspective view and

FIGURE 24 a cross section of a moulded trough-like dispensable container according to the invention.

FIGURE 25 illustrates the heating film used in FIGURES 23 and 24.

FIGURE 26 illustrates the production of a heating film for a folded container.

FIGURE 27 is a plan of the blank from which such a container can be made.

Figure 28:
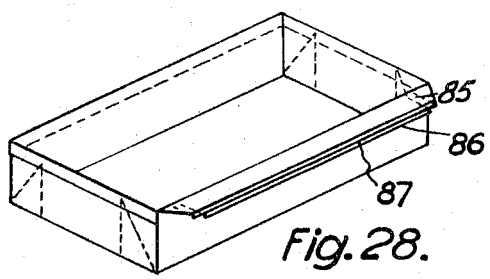

FIGURE 28 is a perspective view of the folded container.

Figure 29:
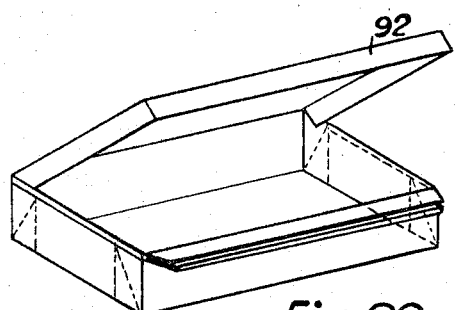

FIGURE 29 is a perspective view and

Figure 30:
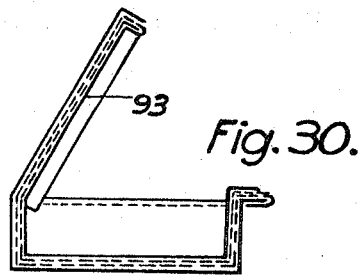

FIGURE 30 a cross section of another folded container.

Figure 31:
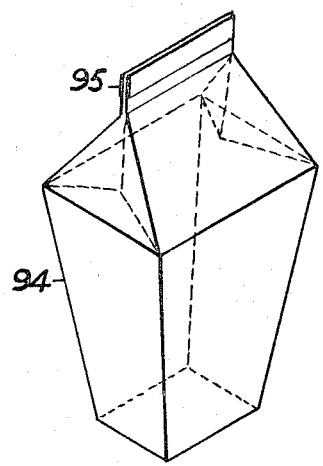

FIGURE 31 is a perspective view and

Figure 32:
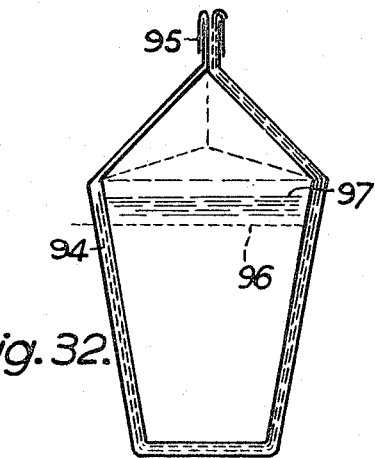

FIGURE 32 a section of yet another folded container.

Figure 33:
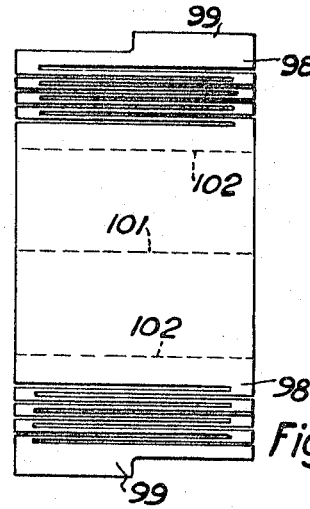
Figure 34:
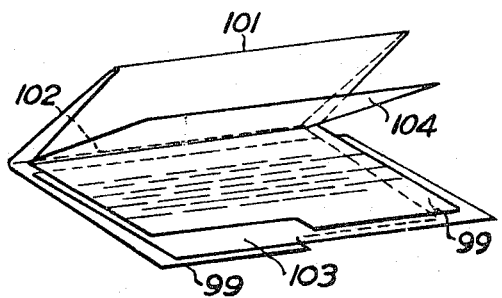

FIGURES 33 and 34 illustrate the production of a heating film with two branches.

Figure 35:
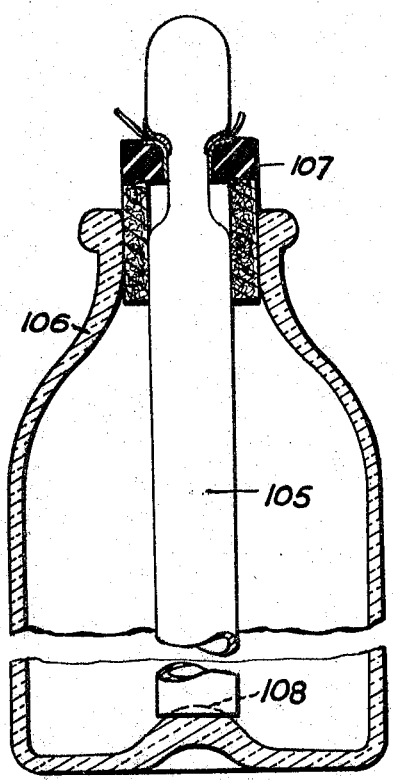
Figure 36:
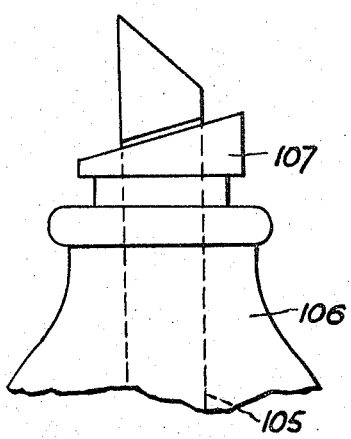

FIGURES 35 and 36 are a vertical section and a detail of a dispensable container for a liquid.

Figure 37:
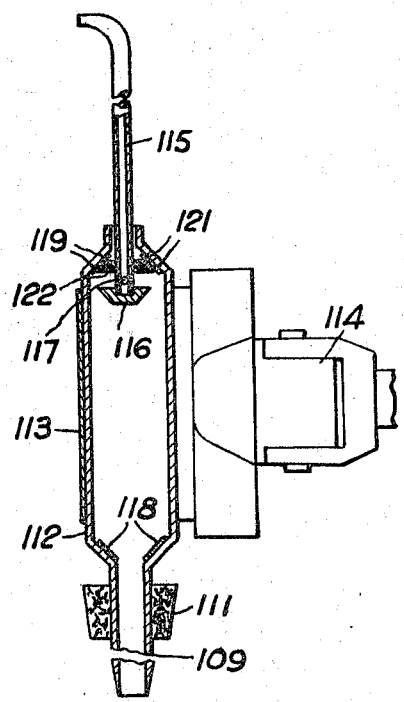

FIGURE 37 is a vertical section of a dispensable container for heating and dispensing a batch of liquid.

Figure 38:
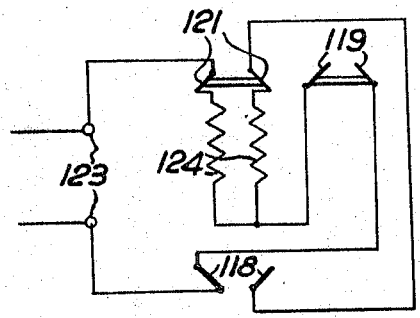

FIGURE 38 is a circuit diagram of the container of FIGURE 37.

FIGURE 39 is a perspective view and

FIGURE 40 is a detail section of another dispensable container for heating and dispensing a batch of liquid.

FIGURE 41 is a perspective view and

FIGURE 42 a section of a dispensable container in which the heating film also indicates the quantity of substance removed.

Figure 43:
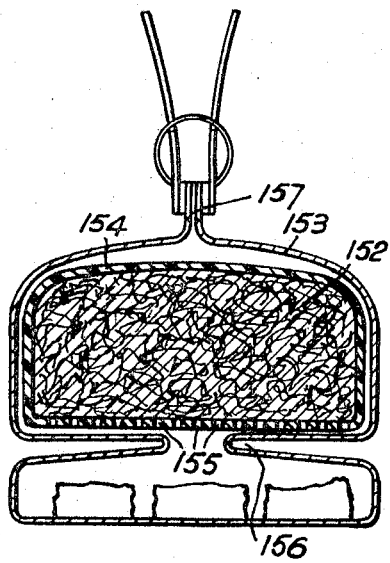

FIGURE 43 is a section of an embodiment which provides for movement of the heating film in relation to the contents of the container.

FIGURES 44 and 45 show two stages in the use of a dispensable container in which the configuration of the film is changed between the stages.

Figure 46:
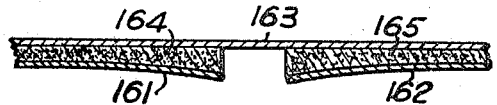

FIGURE 46 is a cross section of a heating film which can be used in the invention embodying a carbon film.

Figure 47:
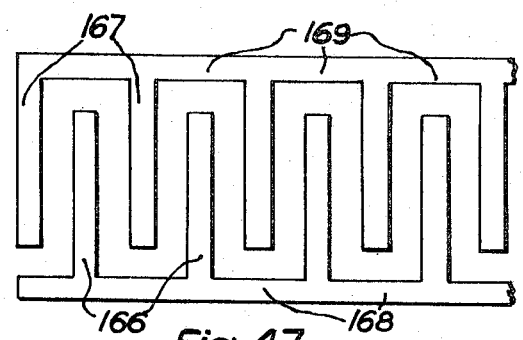

FIGURE 47 is a plan of the electrodes and

Figure 48:
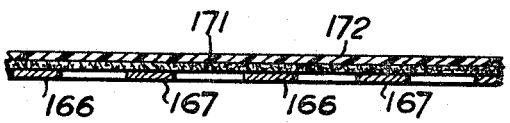

FIGURE 48 a section of another form of heating film embodying a carbon film.

Figure 49:
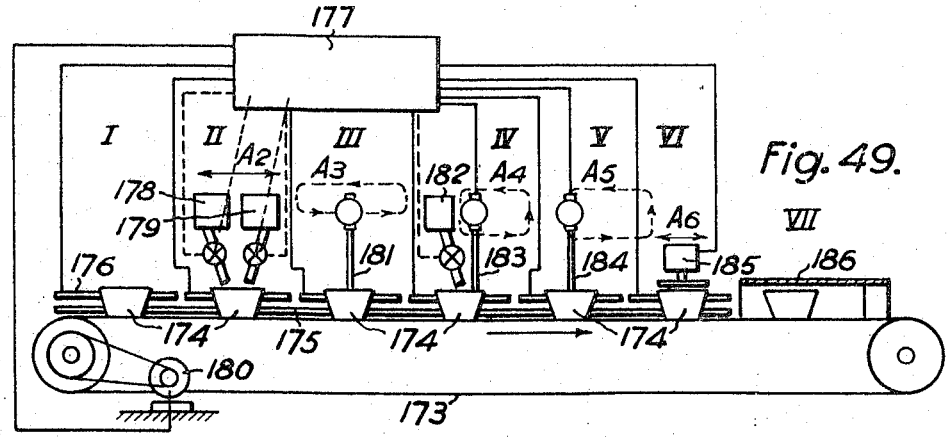

FIGURE 49 illustrates a plant which may be used for processing food during packaging in containers according to the invention.

Figure 50:
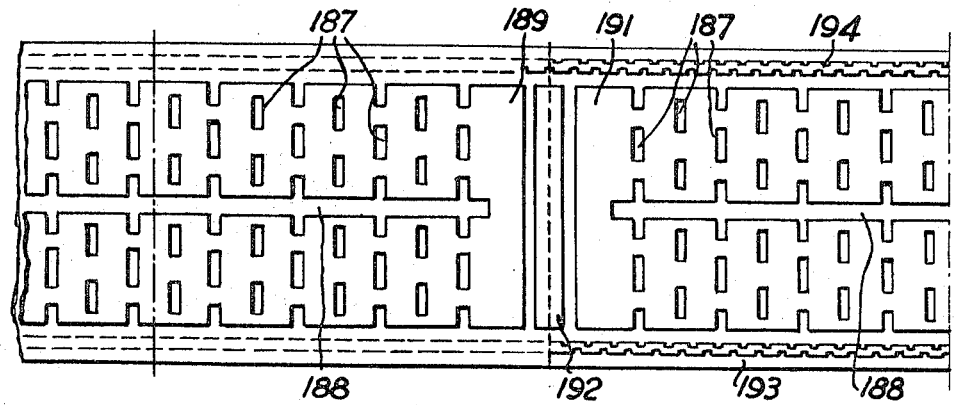

FIGURE 50 shows another form of heating film which can be used in the invention.

Figure 51:
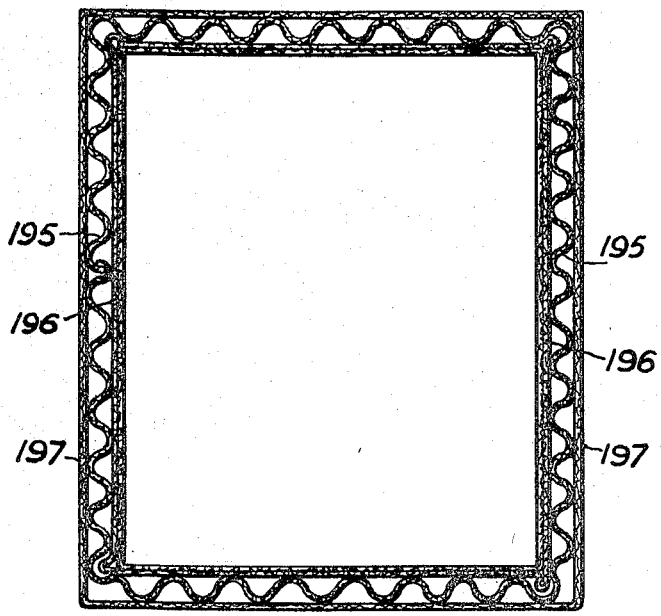
Figure 52:
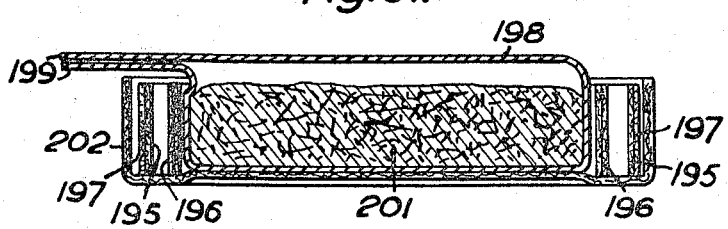

FIGURES 51 and 52, respectively, are plan and elevational medial sectional views of a tray-like food pack having side walls stiffened by corrugated-paper frames.

A typical example of a dispensable container provided with a heating film in accordance with the invention is a metal canister which may contain solid or liquid food or other substances needing to be heated in the container whether before or after the upper end is removed or a puncture is made in the upper end. In such a container the actual wall comes between the heating film and the contents but being of metal and thin in a radial direction it is not only impervious and enduring to relatively high temperatures, but also presents little resistance to the transmission of heat by conduction to the substances inside and presents that resistance in a uniform manner. The invention is however not confined to containers of material which is so impervious and so heat stable as metal. It suffices that the container should be impervious to the substance in it before heating and for a long enough period during heating to avoid difficulty and that it should be sufficiently heat resistant to withstand the heating necessary. Canisters of so called plastics material, canisters of fibre, cardboard, glass and of almost any thin, rigid material may be used. Their heat conductivity is very much lower than that of metal, but it is uniform and since the thickness is small the total thermal resistance is not unduly high.

The heating film is applied to the outside of a canister and may be likened to a label which is commonly used on such a container. However the application of such a label in a sufficiently intimate heat conductive contact to avoid developments of hot spots does present difficulties for which the present invention makes provision. It also makes provision for making connection of the heating film to a supply of electricity.

Figure 1:
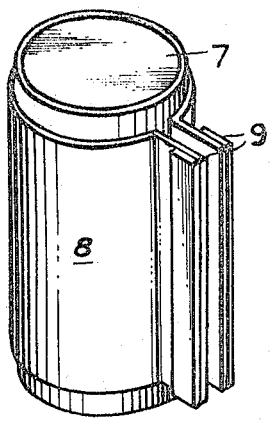
FIGURE 1 is a perspective view of a dispensable canister incorporating a dispensable heating film to the invention.

FIGURE 1 illustrates one form in which the invention is applied to the heating of a substance in a metallic canister 7. The heating film 8 is a sheet or web stuck or otherwise fixed to the outside of the canister 7. The terminals 9 in this example are on end flaps which can be folded against the wall of the canister when not in use. The film may be applied in the canning factory or be supplied for separate application in which case the film may be supplied with a self-adhesive backing in long lengths or as labels in a roll or in a flat dispenser.

The actual structure of the film as used as a label on a metallic canister at the very minimum needs to comprise two layers namely the conductive pattern and a layer of insulation to come between the pattern and the canister. The latter can be paper or similar material or it can be an adhesive used to stick the film to the canister. Another possibility is a porous material e.g. porous paper or thin felt impregnated with an adhesive. Preferably there is also another layer of electrically insulating protective material on the outside of the conductive pattern which again may be strong or reinforced paper which can be imprinted and decorated as desired.

Figure 2:
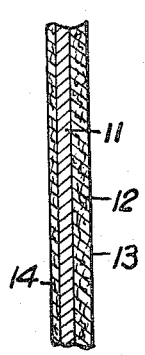
FIGURES 2 and 3 are detail sections of two heating films as used in FIGURE 1.

FIGURE 2 illustrates the cross section of such a film. Here the actual conductive pattern is assumed to be of metal foil 11 slotted to form a meander pattern between the terminals. Such a foil may be in accordance with my Patent No. 3,020,378 or made in accordance with my application Serial No. 165,736, filed January 12, 1962. This foil is desirably crimped and depending on the resistance characteristics required may be of aluminium foil. However, the conductivity of aluminium foil is such that even under the preferred low voltage used for heating, the overall dimensions of the pattern may become inconveniently large, for example with small containers, and a higher resistance material is in such cases preferable. One possible material is a soft foil made from a 3 percent manganese alloy of aluminium. The composition by weight may be 0.09–0.15 percent silicon
    0.16–0.18 percent iron
    2.9–3.15 percent manganese
    Remainder aluminum This alloy has a specific resistance of 13.2 micro-ohms per cm. (about 12 percent of the copper standard) which is very high for an aluminium alloy which can readily be rolled into a thin foil.

Another material which has a sufficiently high resistivity for convenient use is a foil of electrodeposited brass. The brass may be deposited as a whole foil and be afterwards patterned e.g. as in my Patent No. 3,020,378 or my application Serial No. 165,736, filed January 12, 1962, or it may be deposited as the desired meander pattern and subsequently stripped, for instance by deposition on a cylinder of lead or stainless steel the areas of which corresponding to the slots to be provided are made nonconductive, e.g. coated with ink or enamel.

Figure 3:
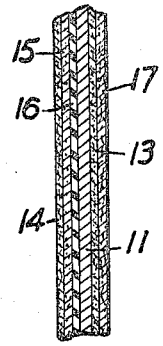

FIGURE 2 indicates an insulating layer on the side to be applied to the canister consisting of a porous paper 12 impregnated with an adhesive 13 the characteristics of which will be described below, while the other side of the foil 11 is protected by a stout paper 14 bonded to it preferably by sodium silicate (water glass). If the package is to be heated to a temperature and for a time which are too strenuous for paper, an asbestos, vermiculate or other high temperature insulating layer is interposed between the foil 11 and paper 14, as indicated at 15 in FIGURE 3, and additional protection may be provided by a heat reflecting metal foil 16 between the layer 15 and the paper 14. Alternatively the paper 14 in FIGURE 2 may be replaced by a cloth or paper made of glass. FIGURE 3 shows only an adhesive 13 on the other side of the foil 11 but a porous layer like 12 of FIGURE 2 could be used and equally the layer 12 could be omitted from the construction of FIGURE 2.

The mere use of an adhesive is not sufficient to ensure good heat conductive contact with the canister over the whole area of the film. If applied in the canning factory good adhesion all over could be ensured at the time of application but its maintenance is not certain. If applied by the retail distributor or the ultimate user, dirt on the can, air bubbles and similar uncontrolled factors makes local low conductivity contacts almost unavoidable.

To deal with this the invention provides means for ensuring intimate heat-conductive contact of the heating film with the outside of the thin, impervious and heat resistant layer constituted by the material of the canister at least when the film is connected to the supply.

One way in which such contact can be ensured is the use of an adhesive (13 in FIGURES 2 and 3) which forms a viscous fluid which wets the heating film at least at the operating temperature of the heating film. It also wets the surface of the canister and the thin liquid layer acts as a heat conductive link between the surface pattern and the canister. When at the operating temperature the layers must be so viscous or thixotropic that it does not drip off the canister but remains as a coherent liquid layer over the whole film area. It may be a hot melt adhesive which is dry at ambient temperature, or a pressure-sensitive adhesive at ambient temperature in which case it will be covered temporarily, that is before application to the canister, by a thin protective layer indicated at 17, FIGURE 3.

Examples of hot melt compounds which can be used are paraffin wax and microcrystalline waxes modified with "Elvex," and ethylene vinyl acetate copolymer supplied by E. I. du Pont de Nemours Inc., of Wilmington, Del., waxes containing "Epolene," a low molecular weight polyethylene supplied by the Eastman Kodak Co., Kingsport, Tennessee, and bitumen with the addition of a small quantity of butyl-rubber and resin or other tackifying resin.

The first two examples are "dry," that is only heat sealing, hot melt layers; the last example forms a pressure-sensitive or self-adhesive as well as heat sealing hot melt layer. A tackifying resin can be added to almost all hot melt compounds used and is sometimes preferred for convenience of application.

A preferred structure of the label is made by laminating a thin condenser tissue paper to the foil surface pattern and coating this tissue with an acetate based self-adhesive film. Prior to use a silicone coated protective paper covers this film if the label as such is supplied to the trade or to the public. This protective non-stick paper is stripped off before the label is applied to the metal container. A particular refinement is the inclusion in the adhesive of an odoriferous substance of plastic of perfumed type such as some essences supplied by W. J. Bush & Co. Ltd., of Ash Grove, London, England, which however only starts to emit an odour when the adhesive film becomes hot. The odour may be chosen according to the nature of the contents of the canister when hot or to act as a deodorant for an undesirable odour of the hot adhesive or of a scorching paper. It also serves as a warning indicating that the heating process has reached a certain stage.

In spite of the use of an adhesive which remains highly viscous or thixotropic when hot there would in various cases be a risk of the label coming loose locally or coming off the container when hot and the invention therefor provides for intimate contact to be maintained by mechanically stressing the film in tension whereby it is pressed against the container wall. It should be kept in mind that a canister is only one example of the many types of container to which the invention is applicable even in the form of an applied label which can be fixed to packages of many shapes and further that the place where the heating is to be effected may vary considerably. A typical instance is a motor vehicle provided with a connection from the battery but there are numerous other possibilities. Many different ways of stressing the film are possible according to the circumstances. Among the possibilities may be mentioned suspending the package by means of the film. For example the package shown in FIGURE 1 may be suspended in the horizontal position by the aid of the means through which contact to the terminals 9 is made, examples of such contact making devices being described below.

Alternatively such means can be arranged to exert a pull or twist on the film or to impose a weight which tensions the film.

Another possibility suitable for substances which are sufficiently elastic is to use a package which is also elastic, e.g. a non-circular plastic or other package and to attach the film so that the film is under tension when secured.

It is possible instead of exerting tension on the film to apply pressure through it. Thus for example the package may be one in which the internal pressure is below atmospheric (skin or shrink packs) in which case if the film is applied before the pressure within the package is reduced atmospheric pressure will constantly press it against the package.

Other possibilities are flexible belts which press the film against the wall of the package or through a flexible wall against the contents. Again stiff closures, tube walls or the like parts of a container may act as pressure pads upon the film.

With these various means the pressure or tension should be arranged to press as large an area as possible of the film into surface contact. It may not always be possible however to confine the conductive surface pattern to the area which is brought into good contact during heating and in that case while those parts which are in good contact with the package or with its contents may be loaded at more than 4 watts per square inch any part which is not in good contact should be at most at a lower electrical loading than the part in good contact and in particular at a loading below 4 watts per square inch.

An alternative to these schemes employs an adhesive which may serve to ensure good heat conductive contact during heating, but which when the substance in the container reaches the desired temperature loses its adhesive properties or runs out altogether, whereupon the forces which have served to hold the heating film in place either disappear or actually displace it so that the film is displaced and its adhesion is broken when the heated substance is ready to be removed from the package.

Reverting now to the application of tension to a label on a conister it has already been mentioned that the means which make contact to the terminals 9 in FIGURE 1 may apply the tension. Such means may be a clip such as that illustrated in FIGURES 4 and 5.

This consists of two pivoted arms 18 terminating in jaws pressed together in this example by the aid of a bow spring 19. The leads 21 bringing the supply are connected to foil contacts 22 (three in this example) backed by rubber or like insulation 23, which are mounted on the jaws and which engage the terminal areas of the heating film such as the terminals 9 of FIGURE 1. To avoid short-circuiting the supply when the clip is released without a heating film in place but with the supply still connected with the leads 21, the contacts 22 extend over less than half the length of the jaws (in the example less than one third of the length of the jaw) and are not opposite one another, but the backing 23 extends over the full length so that the jaws squarely press against the terminal areas on the film or one another.

Alternatively to the clip engaging both terminals 9 of the film, if the canister is bare apart from the label, one terminal may be folded in so that it is in direct contact with the metal canister. Then one pole of the supply may be connected to the canister, and the other by a clip or the like to the other terminal which will be folded outwards as in FIGURE 1.

The label type film shown in FIGURE 1 has a length greater than the circumference of the canister so that practically the whole area of the canister can serve for the conduction of heat, the extra length serving for the application of tension. The extra length is occupied substantially entirely by terminal areas, the surface dissipation of which is negligible and the generation of heat is practically confined to the area in contact with the canister.

Figure 4:
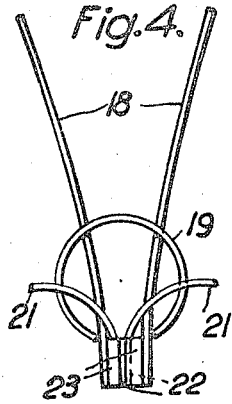
FIGURES 4 and 5 are an elevation and a plan from below of a device for making connection to the heating film.
Figure 5:
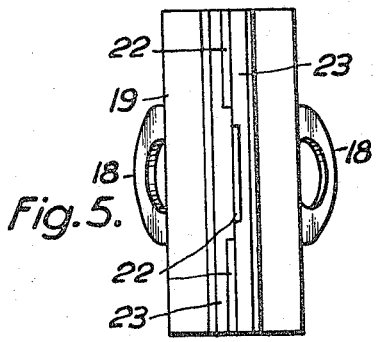
Figures 7, 8:
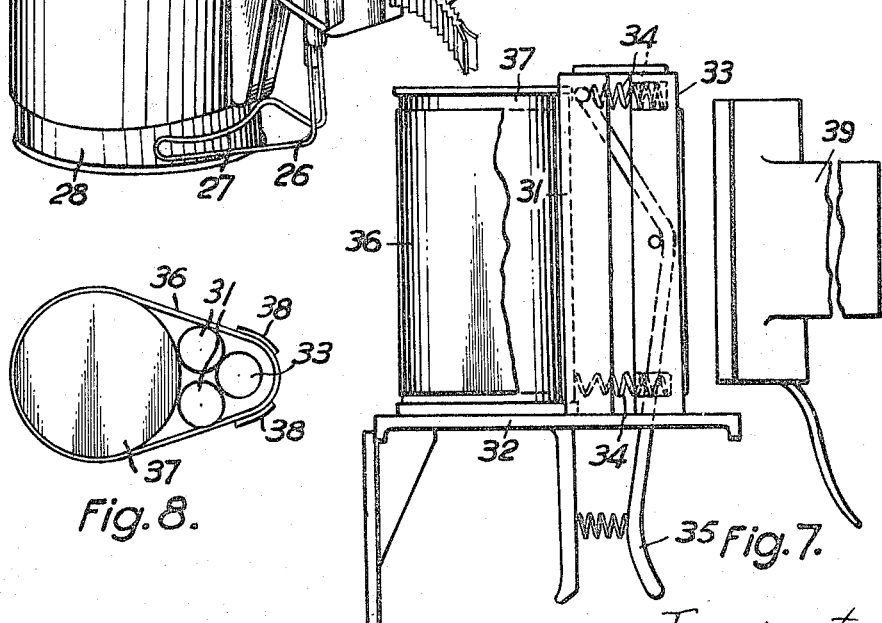

The clip shown in FIGURES 4 and 5 requires some skill in use to ensure proper tensioning of a film such as that shown in FIGURE 1. Further developments of the clip facilitate tensioning.

Figure 6:
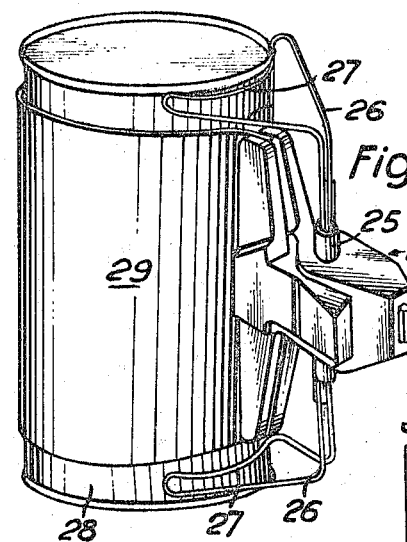
FIGURE 6 is a perspective view similar to FIGURE 1 with a connecting device for applying tension to the heating film.

Thus as shown in FIGURE 6 a clip indicated generally at 24 has a pivot 25 on which the jaws are pivoted together of tubular form and this accommodates bent wire springs 26 so shaped that when their end loops 27 are engaged against the wall of the canister 28 clear of the label 29, they resiliently urge the clip away from the canister. The clip therefore constantly pulls on the label and so holds it in tension. Other features of the clip will be described later.

Another development which facilitates tensioning is a film which while being longer than the circumference of the container, has at least one layer in the form of a closed loop. Then tension can be exerted by the aid of devices which are introduced between the film and the container.

As shown in FIGURES 7 to 10 the device may include two fixed pegs 31 on an adjustable platform or bracket 32 and a peg 33 spring urged away from the pegs 31 by springs 34 and controlled by a handle 35. The handle 35 is operated to bring the peg 33 against the pegs 31, and the closed loop 36 of film on the canister 37 is passed over all three pegs, and rests on the adjustable platform or bracket 32, see FIGURE 8. The handle 35 is then released, when the springs 34 by pressing the peg 33 away from the pegs 31 puts the film under tension with the canister 37 against the pegs 31, see FIGURE 9. The film is made with the terminals at 38 exposed on the outside in a position between the peg 33 and the pegs 31 and contact is made by the aid of a spring clip 39 which slightly increases the tension on the film by bearing against unsupported parts of the film, see FIGURE 10.

Before the container is to be heated, the extra length of film may be closed together, folded over and held by a piece of adhesive tape 41, FIGURE 11.

The device illustrated in FIGURES 7 to 10 can be simplified to avoid the need for three pegs at least one of which is movably mounted. The device illustrated in FIGURES 12 to 15 is a combined bracket and clip which employs only a single fixed peg 42 over which the loop is slipped after the jaws 43, 43 have been opened to the position shown in FIGURE 15. When the jaws are closed (FIGURES 12 and 13) they press on the sides of the loop and draw it tight around the canister and the peg 42, the terminal areas being disposed so that the contacts on the jaws make connection with them. The jaws are pivoted together on a spindle 44 and urged together by overcentre bow springs 45 so that the open and closed positions are stable. These fans are provided with integral finger pieces 46 arranged so that the jaws are opened and closed by pressure on the projecting parts of the finger pieces. The figures also show a switch 47 by which the supply can be controlled.

These arrangements so far described have assumed that the heating film has only two terminals between which the conductive path (which may comprise several branches in parallel) extends. FIGURES 16 and 17 illustrate a development of the clip which provides for connection to a film having the pattern divided into two portions. An example of such a film will be described later in detail but it suffices to say here that the terminal areas are disposed as indicated in FIGURE 18. There is a full length terminal 48 common to both branches of the pattern and insulated from it, the two further terminals 49, 51 one belonging to each branch. The terminals 49, 51 are of half length in line with one another but out of line that is staggered longitudinally with respect to one another and laterally with respect to the terminal 48 and are on opposite sides of the insulating layers. Correspondingly the clip has one long contact 48c and two half length contacts 49c, 51c staggered longitudinally with respect to one another and laterally with respect to the contact 49c and on opposite jaws so that when the jaws are closed on the end of the film they engage the respective terminals. Contacts 49c are provided on both jaws so that provided the film is insulated on the surface opposite the terminal 48 proper contact will be made whichever way the clip is closed upon the terminals while if the clip is closed without a film in position each of the contacts 49c, 51c being opposite an area of the other jaw which will be of insulating material will not cause short circuiting. The coming into contact of the two contacts 48c with one another obviously will not cause any difficulty. If the film has a terminal corresponding to 48 on both sides or if other provision is made to ensure that the clip is always applied the same way round the contact 48c need not be duplicated. Desirably the contacts may be serrated as indicated in FIGURE 16. The pivot 52 on which the jaws are pivoted together is hollow and may be made longer than indicated. It can thus be used to accept springs such as the springs 26 of FIGURE 6 or other devices e.g. tubes described below in connection with the heating of liquids. The clip is also equipped with a single pole changeover switch actuated by a sliding knob 53 and a Spencer type thermostat with a resetting knob 54. Details of the thermostat are shown in FIGURE 19. The thermostat disk 55 normally takes the form shown in which it bridges upper contacts 56. When the heating effect of the current passing through it reaches a certain value it reverses its curvature and takes the dotted line position in which it bridges contacts 57 but it remains in this reversed position even when it has cooled down until the resetting knob 54 is depressed to snap it back to its original curvature.

The corresponding circuit arrangement is shown in FIGURE 20. The switch 58 operated by the knob 53 in the position shown connects one pole of the supply 59 to the contact 48c which is connected to the common terminal 48 of the two branches of the heating film marked 61, 62 respectively. These two branches are connected by the terminals 49, 51 and contacts 49a, 51a to the two contacts 56 of the thermostat. One of these contacts is connected to the other pole of the supply 59, and the other of these contacts is connected to one of the contacts 57. It will be seen that as long as the disk 55 is in the normal condition the bridging the contacts 56 both branches 61, 62 are connected in parallel across the supply 59. At the end of a period determined by the parameters of the heating film and disk, the disk snaps over to bridge the contacts 57. The branch 61 then remains connected across the supply so that heating continues at a lower rate while the branch 62 is switched off. Thus this arrangement permits a high rate of heating for a predetermined period followed by a lower rate of heating. If with the thermostat disk still bridging the contacts 57 (where it will remain even though the current has fallen until the button 54 is depressed) the switch 58 is changed over the upper pole of the supply 59 is disconnected from the common terminal 48 and is connected to the lower contact 57. In this position the two branches 61, 62 will be in series across the supply so that an even lower rate of heating will be obtained. If with the changeover switch in this position the resetting button 54 is depressed thus bringing the disk back to normal position where it bridges the contacts 56 the circuit will be completely interrupted and may only be restored by returning the change over switch to its first position.

It will be seen that whatever manipulations are effected by the user he cannot set up any dangerous condition or override conditions determined by the thermostat. This particular scheme constitutes an electrical interlock which only permits mutually compatible schemes of connections to be set up. It would be possible to provide a mechanical interlock having the same effect and to develop more elaborate schemes by the use of a film with more than two branches and three terminals.

When a low voltage supply is used as is preferred, for example 12 volts as in the case of a motorcar battery, the current required is relatively heavy and requires the use of supply conductors of such cross section that if ordinary stranded cables were used they would be heavier than desirable. The invention therefore makes economical and convenient provisions for enabling the clip to be given freedom of spatial and directional position within the limits of the length of the cable while supporting at least the major part of the weight of the clip. To this end the cable which may be of considerable length is made flexible in at least one transverse direction so that it can be rolled on a drum if need be or rolled on itself after the fashion of a measuring tape on a spring reel. This may be achieved by making the conductors at least over part of the length of foil form. This enables the clip to be manipulated in at least one direction while the cable supports the weight of the clip. A cable of this form using crimped foil conductors is indicated at 63 in FIGURE 6.

The other end of the cable is connected to the supply by a plug and socket arrangement which provides freedom of rotation about two axes at right angles to one another both lying in the plane in which cable can flex. As shown in FIGURE 21 in which the insulation of the cable is omitted the two foil conductors 64, 65 are held by an insulated rivet 66 from one another but in good electrical contact with respective conductors 67, 68 which communicate with two separate coaxial contacts 69, 71 on an insulating support 72. This plug coacts with a corresponding socket shown in FIGURE 22 having contacts 73, 74 to cooperate with the contacts 69, 71. The active parts of the contacts 73, 74 may be inwardly sprung tongues and one pole of the supply is connected by a further tongue such as 75 to the contact 73. The earth return is provided for the contact 74 the socket being metallically connected to a metal panel 76 by a conventional nut 77. The contact 74 is continuous with the part of the socket which contacts with the panel 76. The cable conductors 64, 65 can be rotated in relation to the plug about the axis of the rivet 66 while the plug can be rotated in the socket about its own longitudinal axis.

Desirably the plug is provided with an indicator lamp 78 permanently connected across its two contacts and protected by a glass or plastic lens or cover 79 so that a visual indication is given whenever the plug is connected to the supply.

The application of the invention to containers of canister form has been described above. It is equally applicable to containers of moulded papier mache or similar materials, the heating film being made integral with a folded-over unpatterned portion which forms an impervious cover layer which serves to enclose the substance in the container notwithstanding that the other material of the package may be porous, a thin electrically insulating layer coming between the folded-over portion and the pattern. The papier mache is a relatively stiff fibrous material and it forms a thermally insulating layer, while the thin insulation and plain folded-over portion do not impose any great thermal resistance between the pattern and the packaged substance.

FIGURE 23 is a perspective view of an open trough like box which may be moulded of such material as papier mache. The heating film itself is made from metallic foil of the general form shown in FIGURE 25. It consists of a plain part 81 integral with a patterned part 82. In the figure a single meander path is formed by the pattern between the central zone and one margin of the complete piece of foil, but this is only one variety; generally the pattern comprises a number of repeats. The part 81 is of somewhat greater length than the part 82. A thin layer of insulating material for example paper of somewhat less width than the portion 82 but greater length is laid over it as indicated by the dotted line 83 and the portion 81 is then folded over the insulation on the line 84. This portion is of less width than the insulation 83 and thus after folding its edge is overlapped by the insulation. The margin of the portion 82 extends beyond the edge of the insulation 83. The foil and insulation may be held together by adhesive. The film so made is depressed into the trough like box and the edges are lapped over the edges of the box as indicated by the cross section FIGURE 4, the dimensions of the film being designed so that the fold at 84 reaches just under the edge of the box, the edge of the portion 81 remains wholly on top while the projecting margin of the portion 82 is also lapped over the edge of the box. These two margins thus constitute the terminals of the pattern and connection can be made by means of a clip such as that shown in FIGURES 2 and 3.

The length of the patterned portion 82 may be such that it lies wholly within the box while the length of the portion 81 is such that it extends over the end walls of the box and over the upper edge. There will be some puckering of the portion 81 at the corners but this need not damage it and the foil will form an impervious lining which covers the slots in the pattern and is of good heat conductivity. The folding of this portion to fit the container may be facilitated by crimping the material and such crimping may also extend to the patterned portion 81 or the latter may be plain while only the portion 82 is crimped. After the box has been filled the open top may be closed by a cover held by adhesive and this may be arranged actually to press the packed substance against the heating film. Instead of a simple cover a second similar box can be used and the two be secured together by adhesive at the margins but the terminals of the films will need to be brought further out to permit connection to be made.

FIGURES 26 to 28 illustrate a somewhat similar container to FIGURES 23 to 25, but produced by shaping, scoring and folding of flat stiff fibrous thermally insulating material such as cardboard, incorporating the heating film. As before the film itself is made of a doubled piece of foil comprising a plain part 85, a patterned part 86, and a layer of insulation 87 between the two portions. After the film has been made, it is laid on (and may be laminated to) a sheet 88 of cardboard or similar material which has been slotted as at 89 and creased at the dotted lines 91. Thereafter the assembled material is folded at the crease lines and in the corners in the well-known fashion to produce an open box as in FIGURE 28.

The laminated packaging material can be produced in a web and is cut up in pieces for shipping as flat stock to be erected into a box when the box is filled. It can instead be supplied in the web, and the plain parts 85 which are to form the impervious inner layer of the box can be left uncrimped, if desired, although the patterned parts 86 may be crimped.

It will be seen in FIGURE 27 that the margin of the patterned part 86 extends furthermost to the right, that the insulating sheet 87 does not extend quite as far while the edge of the plain part 85 of the foil does not reach quite to the edge of the paper sheet 87, but all these margins extend so far that when the folding is completed a projecting margin is formed with foil exposed on both sides. This foil constitutes the terminals and the projecting margin of the part 86 may be folded under so that both terminals are slightly overlapped by the paper 87. As before the patterned part 86 does not extend beyond the ends of the bottom of the box but the plain part 85 covers the bottom and all four walls of the box. The box may be closed by a plain cover or two boxes may be used together if provision is made for access to the terminals.

If it is necessary or desirable to provide for the substance in the box to be heated from the top as well as the bottom, as shown in FIGURES 29 and 30 a folded box may be produced having an integral hinged lid 92, a heating film 93 extending into the lid. The film itself is made on the same lines as in FIGURES 26 to 28 the dimensions being modified and the terminals are brought out exactly as in FIGURE 28. The shape, slotting and creasing of the cardboard or similar material and the manner of folding are in themselves well known and need not be described further. With this arrangement connection to the film can be effected without opening the box but if preferred the margin with the terminals can be folded inward so that the box must be partially opened to gain access to the terminals though they may then be folded outward. The package may be sealed with the terminals folded in and the lid sealed so that the purchaser has to destroy the seal to obtain access to the terminals.

For packaging and heating a liquid, a box as shown in FIGURES 31 and 32 may be used. Such a box again is of well-known form and can be produced by folding from a blank of suitable shape on very similar lines to FIGURES 26 to 30. A heating film 94 with accessible terminals 95 is incorporated and the patterned area extends up to the level 96 while the liquid level is at 97, so that it wholly covers the area of the film in which heat is developed.

By suitably changing the dimension and proportions of the blank various other folded box type containers can be produced and similarly moulded containers on the lines of FIGURES 23 to 25 can be produced with different proportions. A moulded container can be provided with a heated lid by extending the film into a moulded lid.

A particular difference between a moulded container and a folded container is that the latter necessarily has sharp corners at the folds while a moulded container can be produced with rounded corners which may be more desirable in some cases. Where the heating film extends into the lid the pattern may be dimensioned so that the heat developed per unit of area is different in the lid from what it is in the bottom of the container.

FIGURES 23 to 32 show the heating pattern consisting only of one meander path. This is done for sake of simplicity of drawing; each pattern can consist of a group of equal or different repeats, i.e. meander paths in parallel. These examples also assume a pattern of a single resistance or resistance grouping between two terminals and thus a single rate of heating and of heat distribution to the contents of the container under a specific supply voltage. A pattern with two branches having its terminals disposed as in FIGURE 18 adapted to have connection made to it by a clip as in FIGURES 16 and 17 may be made as illustrated in FIGURES 33 and 34. A piece of foil (which again may be cut from a continuous length bearing a repeating pattern) has two patterned margins 98 each with a half length tab 99 at the extreme edge these tabs being relatively longitudinally staggered. The foil is scored and folded at its longitudinal centre line 101 and again at two longitudinal lines 102. Two pieces of sheet insulation, e.g. paper, are introduced. One piece 103 goes between the two patterns. On one edge it reaches almost to the score lines 102 while on the other edge it reaches just beyond the edges of the tabs 99 so that the latter are effectively insulated from one another. The second sheet of insulation 104 is introduced between the upper surface of one pattern and the under surface of the doubled centre zone of the film. One edge of this insulation reaches the folds 102 while the other leaves the upper tab 99 exposed. The dimensions of the film and position of the score lines 101, 102 are such that the fold at 101 does not reach to the outer edge of the insulation 104 so that the latter effectively insulates the plain part of the foil over the upper pattern. The two tabs 99 constitute terminals equivalent to the terminals 49, 51 of FIGURE 18 while the zone of the plain part of the foil adjacent the fold 101 constitutes the common terminal equivalent to the terminal 48 of FIGURE 18. It will be clear that a heating film so made can be used for example in boxes such as those described with reference to FIGURES 23 to 32 and that the plain parts of the foil can be made longer to cover the end walls of the box. Similar patterns can be used as label type films for canisters as described with reference to FIGURES 1 to 6 or again as endless labels as described with reference to FIGURES 7 to 15. They can also be used in the heating of liquids at the time of dispensing from a storage vessel as described below.

A simple way of heating a liquid is to provide a tube communicating with the interior of the container the heating film being incorporated in the wall of the tube and having accessible terminals. Thus as shown in FIGURES 35 and 36, a film formed into a tube 105 passes through the stopper of a bottle 106 and its upper end is cut off at a slope to form a pouring spout. Just where it comes through the stopper its sides are pinched in and the terminal areas are provided here to be engaged by a forked wedge form connector 107 on which connecting foils are provided to make contact with the terminal areas and lift the tube 105 a little so that its lower end rises above a boss 108 on the bottom of the bottle which previously closed it and allows the bottle contents to be poured out becoming heated as they flow along the tube. An additional closure and sealed cover can be provided at the upper end of the tube to exclude dust and the line before use and to ensure that the bottle has not been tampered with.

More elaborate arrangements which enable specific quantities to be drawn out of a storage vessel and then heated before being dispensed comprise a tube having one end portion adapted to be inserted into the vessel, another end portion for discharge and between the end portions an enlargement of such volume as to contain at least one batch of the liquid. Suction is generated at the discharge end of the tube by sucking, by squeezing the flexible tube walls or otherwise and flow control means enable this to be used at choice to draw liquid from the vessel into the enlargement and to draw liquid from the enlargement through the discharge end. The dispensable heating film is in good contact with tube wall at least over the major part of the enlargement and the whole device constitutes a dispensable container. Flow control means may be combined with switching means for the heating film whereby the current can be varied according to whether liquid is being drawn into the enlargement or out of the enlargement, the film then having a pattern with at least two branches as described above.

FIGURE 37 shows a device on the above lines. The tube 109 carried for example by a cork or similar stopper 111 and long enough to extend to the bottom of a storage vessel such as a bottle has a portion 112 of enlarged diameter above the stopper and of a volume to contain one batch to be dispensed. In good heat conductive contact with the wall of the enlargement 112 is a heating film 113 having two branches the terminals being brought out and connection being made by a clip 114. However there need only be two terminals and two contacts on the clip as the control of the flow through the two branches is not effected through the clip but by means of a draw-off tube 115. The draw-off tube is a sliding fit in the contracted upper end of the enlargement. To draw liquid into the enlargement the tube 115 is brought into its uppermost position shown in FIGURE 37, when a fitting 122 ensures a sufficiently airtight closure of the enlargement. Suction on the outer end of the tube 115 will now draw liquid into the enlargement 112 and if the outer end is now closed by the finger the liquid will remain in the enlargement while the tube 115 is depressed until a conical fitting 116 at its lower end seats in the bottom of the enlargement and thus prevents liquid from running back into the bottle. There is a hole 117 in the tube 115 which is just above the fitting 116 so that if now suction is applied to the outer end the liquid will be drawn through the hole 117 into the tube 115 and out of its upper end, air entering between the tube 115 and the contracted end of the enlargement, a groove being provided if necessary for the passage of air.

There are two contacts 118 at the lower end of the enlargement which are bridged electrically by the fitting 116 in the lowered position of the tube 115. There are two separate pairs of contacts 119, 121 at the upper end of the enlargement which are separately bridged by the fitting 122 on the tube 115 when this in the position shown in FIGURE 37. The circuit is shown in FIGURE 38. With the tube 115 in the position of FIGURE 37 for drawing liquid into the enlargement there is no bridge across the contacts 118, consequently the supply passes from the lower of the terminals 123 first to the contacts 119 which are bridged by fitting 122 and thence to a terminal common to the two branches 124 of the heating film and then through the contacts 121 also bridged to the other terminal of the supply. Thus the two branches are in parallel and the maximum rate of heating is achieved. After the liquid has been heated as desired the tube 115 is depressed and in its lowermost position contacts 119 are disconnected, contacts 121 are disconnected, but contacts 118 are bridged. Accordingly the lower terminal of the supply is connected to the upper end of one of the branches 124 and the upper end of the other branch 124 is connected to the other terminal of the supply. The two branches are thus connected in series and the rate of heat development is therefore reduced to a quarter of what it was before serving to maintain the temperature of the liquid will slowly rise or fall will depend on the conditions of the particular case. Suction can be applied by any means but it is contemplated that this device is generally to be used for a beverage to be consumed by suction applied by the mouth after the fashion of a drinking straw.

The device illustrated in FIGURES 39 and 40 enables suction to be generated by the device itself more conveniently than in the device of FIG. 37.

In this case there is again a tube, marked 125 which reaches to the lower end of the storage vessel 126. It is shown passing through a closure in the top of a bottle but might carry a cork or the like as in FIGURE 37. The tube 125 communicates with the upper end of an enlargement 127 which is made of cheap flexible material, e.g. polythene. The enlargement is equipped with a discharge tube 128 which reaches practically to the bottom, but also has an aperture 129 near its upper end, just under the flexible top 131 of the enlargement. Close by is an aperture 132 in the top 131 with a flap 133 which can close it but which tends to spring open.

Round the enlargement 127, in good heat conductive contact with it, is the dispensable heating film 134 provided with a two branch pattern. Connection is made to one branch by a clip 135, the pivot 136 of which is tubular as above described with reference to FIGURES 6 and 16 and this serves to hold the clip and enlargement together by passing the tube 125 through the pivot.

The second branch of the film pattern has a terminal area 137 covered at its end, near the clip attachment, by thin insulation 138 such as paper and over this is a piece 139 of spring foil with which the clip makes contact and which overlaps the paper 138 but normally springs away from the terminal area 137.

In use, by closing apertures 129 and 132 by finger pressure on the top 131 and flap 133, and applying suction to the end of the discharge tube 128 liquid can be drawn out of the vessel 126 and the enlargement 127. If the flap 133 is now released while the aperture 129 is held closed, continued suction will draw liquid out of the enlargement 127 and the tube 128. Alternatively the enlargement can be squeezed to drive out air, the apertures 129, 132 and the discharge end of the tube 128 be closed and the enlargement then released when its expansion will generate suction which will draw some liquid up into the enlargement and this pumping action can be repeated until the enlargement is full. Then further squeezing with both apertures closed will discharge liquid from the enlargement through the tube 128.

One terminal of the film will be in circuit as long as the supply is connected, while the other can be brought into action by pressing the foil 139 into contact with the terminal area 137. The fact that these foils are bare does not matter with a low supply voltage of say 12 volts. Both branches are brought into operation for rapid heating of the liquid when the enlargement is full, and one branch to maintain the temperature during the discharge of the enlargement. Alternatively the clip and terminal pattern of the film may be as described above with reference to FIGURES 16 to 20 to enable the heat dissipation to be varied.

The devices shown in FIGURES 37 to 40 can readily be produced by moulding such a material as polythene and will be cheap enough to be dispensable. Their shapes may vary considerably from those shown without any change in their operation. They may also be made of other materials and by other methods without any change in their operation, for example of folded paper or the like of a quality which remains impervious for the necessary period of use.

A dispensable container and dispensable heating film according to the invention can also be used in cases in which only part of the contents of a package are to be used at a time, in which case the film can be provided with means visible from the outside indicating the proportion of heated substance removed from the container. For example the film may be wrapped round the substance and have one end held under tension so that when some of the substance has been withdrawn, the film is drawn close to the reduced volume of the substance, a corresponding length of the film being drawn out of the container and serving as a measure of the removed substance.

As shown in FIGURES 41 and 42 a dispensable container 141 of somewhat similar form to that shown in FIGURES 31 and 32 and which would similarly be made of folded paper or cardboard is equipped with a heating film 142 which surrounds a flexible bag 143 containing the substance 144 to be heated but is not stuck to the inside of the container. The container has a narrow aperture 145 of its full width and one edge 146 of the film is secured to the edge of the aperture, while the margin 147 at the other edge incorporates the terminals and passes through the aperture. When the container is full (FIG. 42) this only need emerge enough to permit access to the terminals by a clip 148 through which connection is made. Before use, this margin may be folded over and covered with a seal of paper or the like. The container also has provision for withdrawing heated substance through the end. For a granular substance it may for example simply be cut open for the purpose or have a scored area which can easily be removed, or if the substance is a liquid or becomes liquid when hot there may be a tube 149.

To heat the substance the whole is simply suspended from the clip as indicated in FIGURE 41, when the weight holds the film in tension. When some of the heated substance is removed, a corresponding length of the film is drawn out and it is calibrated with markings indicated at 151 showing what proportion has been removed.

The above example has the film movable in relation to the container and its contents. So far as any part is no longer dissipating heat into the substance it is outside the container and accordingly as long as the film has no area dissipating more than 4 w./sq. inch no difficulty should arise even though this part dissipates heat at the same rate as that in contact with the substance. However other cases arise in which relative movement between the film and container is required, effected by means operable without removing the substance from the container for the purpose of changing the heat dissipating relationship of the film to at least part of the substance in the container. It may be necessary for example to change from conductive heating to radiative heating or to apply the heat to two different substances one of which changes its state and requires greater space for its accommodation.

An example of the latter is illustrated in FIGURE 43. This illustrates the defreezing and then steaming of frozen raw food such as vegetables. The food 152 is enclosed in a bag 153 which incorporates the heating film and is held in a separate wrapper 154 at least the bottom of which is porous as at 155. The heating film is designed so that it develops most heat at the bottom of the bag. The lower part of the bag has at least one concertina fold as at 156 and contains the necessary water or other liquid. This liquid can be in the form of an ice cube inserted during packing or liquid can be added by the user when he opens the upper end of the bag to gain access to the terminals 157. In use the bag is suspended by the terminals 157 in a clip connector such as that shown in FIGURES 4 and 5. The bag at first remains folded until defreezing is completed and the liquid is heated up, but when the pressure rises the fold 156 unfolds and room is left at the top for steam. If need be, there can be several folds depending on the proportions, the rate of boiling and such like conditions. Only a small steam escape is provided and there will be a constant reflux of condensed steam back into the body of liquid being boiled. Instead of a bag, a box may be used but this must be large enough to provide the necessary steam space.

For some purposes it may be desirable for the heating film or part of it to occupy a compact configuration before the ultimate removal of the heated substance from the dispensable container, means being provided which are operable without removing the substance from the container for stretching the film or the aforesaid part of it into an extended form and location for transferring heat from it to the substance. To permit heating while the film is in its compact configuration its terminals are made accessible without removing the substance from the container.

An example is food in slices. In FIGURE 44 the film is a long web 158 folded concertina-wise, the folds holding thin slices 159 of the foodstuff. The whole may may be enclosed in a usual wrapping or container not shown. This arrangement permits very quick heating up in view of the large surface area in contact with the food and the thinness of the food sandwiched between the folds of the heating film. As shown only the odd folds of the web are filled with food slices, the even folds being compressed together; thus the web assumes a comb-like configuration. The comb ends may as shown be bent to enclose the slices completely. The heating film may be porous or perforated to permit circulation of liquid or vapour between adjacent slices or the slices may have inner wrappings for easier and cleaner removal. More than one web may be arranged in a food package or container. This application of the heating film is one preferred way for quick defreezing of deep-frozen food, for rendering wafers and biscuits crisp again and for many solid foods which are enclosed in a package of insufficient surface areas to permit a speedy enough penetration of heat from that area to the inside.

When the film is supplied with current in its folded compact configuration each slice is heated from both sides and this combined with the small external surface ensures rapid heating. When the slices are to be removed, the whole is unfolded into the form shown in FIGURE 45. Assuming all the slices 159 remain associated with the corresponding folds of the film 158, when unfolded there will be a single width of film alternating with each slice. Thus if the current supply is maintained a smaller proportion of the total heat will be conducted into the slices so that they will be heated to a lesser extent. The pattern of the film can be designed to proportion the heat which reaches the slices and that which is simply radiated away as desired, in particular it may be more than 4 watts per square inch in those parts on which the slices rest and less in the other parts.

The heating film can have terminals not shown at the folds or some of them to permit the heating of a single slice or of a group of slices whether in the folded or unfolded configuration.

The film above described have all had the resistive path formed by a meander patterned foil. The invention provides other forms of resistive path which can be made sufficiently thin and flexible and sufficiently cheaply to be dispensable. In these the surface pattern includes at least two large surface areas of thin metallic layers forming the terminals and also forming adjacent electrodes, and a carbon film which extends over said electrodes and forms the electrical path between them.

One form which such a resistive path can take is shown in section in FIGURE 46. This comprises three sheets of metallic foil, e.g., tinfoil or aluminium foil. Two sheets 161, 162 (in this example of the same width) are spaced apart while the third sheet 163 is wide enough to extend over the other two sheets. All three sheets constitute electrodes of large area while parts of the sheets 161, 162 also constitute terminal areas. A film 164 incorporating carbon, e.g., graphite, particles as the conductive ingredient is interposed between the sheets 161, 163 and another carbon film 165 between the sheets 163, 162, the current flow being through the thickness of these films but along the foil sheets as seen in FIGURE 46.

To control the current distribution and thus the heat development, the thickness of the films 164, 165 may vary along them. Uniform distribution, which will usually be wanted, requires the thickness to increase towards the adjacent edges of the sheets 161, 162 as is indicated in the drawing.

The carbon, e.g., graphite particles, are held in place in the film by a so-called plastic material or some other binder such as is used in the resistors used in electronic apparatus. Choice of the nature and proportion of the binder enables the resistivity of the film to be given the value required for the particular supply voltage or loading in view.

The structure shown in FIGURE 46 will need insulation (not shown) on one or both faces, which may be of paper, lacquer, or other thin flexible material, appropriate terminal areas being left bare for making connection, suitably by a clip as above described. In the case of a metallic canister, the third sheet 163 may be constituted by the wall of the canister itself.

It will be seen that this structure has the path in two distinct branches in series between the terminal areas. The two branches are shown equal but they could be unequal whether in width or thickness. The sheet 163 can also serve as a common terminal and the film can be used in the same circuit arrangement as described above for example with reference to FIGURE 20.

Another form in which the resistive path is a carbon, e.g. graphite, film between electrodes is illustrated in FIGURES 47 and 48. Here there are two comb-like members of metallic foil having their respective limbs 166, 167 intermeshed while their continuous parts 168, 169 contitute terminals. Space is left between the limbs and continuous parts which is bridged by the carbon film 171, and the current flows through it in the plane of the carbon film. The resistivity of the metallic foil may be substantially negligible compared with that of the carbon film so that each electrode and terminal member is at substantially the same potential at all parts and the voltage drop and therefore the heat development will be substantially limited to the carbon film. Choice of the spacing between the electrode limbs enables the heat distribution to be controlled.

This structure needs a layer of insulation 172 on the back of the carbon film 171. This can be a separate sheet, for example of paper, or if the part of the container to which the film is applied is of insulating material it may be constituted by the container wall. There may also be a sheet of insulation over the metallic foils, leaving adequate terminal areas bare or accessible.

It will be clear that both forms of resistive paths illustrated in FIGURE 46 and FIGURES 47 and 48 can be produced in long lengths and pieces of the required length be cut off to make individual heating films before or after the application of insulation.

The present invention provides for the packaging in dispensable containers incorporating a dispensable heating film, of food which includes at least one comminuted ingredient, in single or multiple portions up to what may be called family size portions e.g. suitable for six persons, which has been processed in accordance with the receipe and method of a skilled cook so that after heating in the package, the processed food has the same quality and character as food originally prepared by the cook.

To this end the cook manually processes the food in accordance with his receipe and method and every step, in particular the quantities and form of each ingredient, the times, temperatures and rates at which these are added, and the time and intensity of the mechanical manipulations and movements of the ingredients whereby they are mixed are recorded. The plant in which the food to be packaged is prepared is equipped with a controllable-speed conveyor which carries the containers through a succession of stations and during their passage through the apparatus contact is made to the externally accessible terminals of their heating films whereby each can be supplied with current which can be regulated as a function of the position of the container and time. The stations are equipped with controllable devices for discharging ingredients in predetermined quantities at predetermined rates and if need be at predetermined temperatures, and controllable devices for mechanically moving thereby mixing the ingredients in the containers for predetermined times and at predetermined intensity. (The containers will generally be open topped and may for example be of the forms illustrated in FIGURES 23 to 32.)

The position and nature of the equipment at the stations and of discharge pipes and the like will in general be adjustable so that time intervals can be adjusted having regard to the speed of the conveyor and the positions of the stations. The equipment also includes a programming controller for simultaneously actuating the control means of the conveyor, the electrical supply and the various discharging and mixing devices, so that the equipment follows a master programme. The master programme may for instance be embodied in a punched tape or punched cards. Such a controller and such tape or cards are in themselves well known, and the devices used in the equipment can also be of well-known kind, so that they do not need to be described herein.

The record taken from the cook's manual operations is analyzed and from this analysis an edited master programme is prepared for the programming control. Editing is necessary because in general the cook's operations are effected at different positions from those which must be employed in the equipment. For example he will perform at one place a sequence of operations which in the automatic equipment will be performed at several different stations. Thus the programme needs to be edited to translate certain of the timings of the cook's operations into movements of the conveyor. Other factors may also need editing. Once the master programme has been prepared and applied to the equipment, and the proper materials are used the equipment automatically follows the cook's original recipe and method. It will be clear that the equipment can be used to follow a variety of different recipes and methods within the range of its adjustment. It is simply necessary to change the master programme.

The equipment and programme may be arranged so that when the containers first enter the plant, before any ingredients are discharged into the containers, they are sterilized by a heat flash imparted by the aid of the heating film. At the other end of the plant a hermetic cover is applied to the container or the container is otherwise hermetically closed, and it is then cooled down, cooling preferably being speeded by the conveyor carrying the sealed containers through a cooling chamber. This automatically reduces the pressure within the containers which in effect become vacuum packages.

An elementary form of a plant on the above lines is illustrated in FIGURE 49. A conveyor 173 carries the containers 174 through seven stations I to VII. Their terminals contact with one continuous bus bar 175 and another bus bar 176 divided into sections (corresponding with the stations though further subdivisions may be employed if necessary) separately connected to the programming controller 177. At station I flash sterilization is effected by raising the heating film to a high temperature for a short time. At station II, two ingredients are added from vessels 178, 179 having control valves or the like linked to the controller. The vessels are mounted to move with the container the necessary distance (arrow A2) for the time necessary to deliver the controlled quantity of the ingredients at the controlled rate, and then to return ready for the arrival of the next container. At section III the ingredients are mixed by a stirrer 181 which moves along the path A3 so that at the end of the predetermined mixing time the stirrer is lifted and returned to the starting point where it is lowered into the next container. At station IV another ingredient is added from a vessel 182 with a control valve or the like linked to the controller and at the same time mixed by a stirrer 183. The vessel and stirrer move in the path A4 so that the stirrer is lifted before returning to the starting point. It is not essential that the vessel 182 should also be lifted and it is a matter of convenience whether it does or not. At station V the ingredients are again agitated by a stirrer 184 following the path A5. At station VI the container has a cover applied by a device 185 which takes the path A6 and at the last station VII the sealed container is passing through a cooling chamber 186.

It is assumed that the stirrers and sealing devices are electrically operated and the conveyor electrically driven by a motor 180 and all these devices also connected to the controller.

It will be obvious that any number of stations could be provided, and the number and nature of the devices at each be suited to the operations to be performed, and that the paths of the devices may be adjustable to suit the time they need to be in action. Again if any particular ingredient has to be processed for example minced, just prior to delivery the necessary devices will be provided associated with the delivery means. Also if any particular ingredient is added in portions at different stations, a stationary single storage vessel may have several flexible discharge pipes with control valves or the like. Indeed any of the storage vessels may be stationary and discharge through a flexible pipe to allow for the movement of the container.

The example assumes a continuously moving conveyor on which the containers are carried at equal spacing related to the stations. The containers may be placed on and removed from the conveyor by hand or devices of known kind can be used to effect these operations automatically.

It would also be possible to use a conveyor which moves intermittently at regular intervals in which case horizontal movements of the devices at the stations would not be necessary. In either case if the ingredients only need to be maintained at a particular temperature without addition or agitation i.e. cooked, at certain stages in the sequence of operations, this can be effected at corresponding stations by removing or by putting out of action by the controller, any devices available at these stations. A single station equipped with a stirrer, filling devices and a variable power supply all run by a controller, can be used in restaurants, households and for preparation of various chemicals in laboratories. The food or substance is automatically filled into the container, mixed and heated according to an edited master programme and the food, or chemical may be consumed or used immediately. The restaurant, home, or laboratory may hold a great number of such recorded master programmes in store and thus be equipped to prepare any of a great number of dishes or chemicals on demand.

The above embodiments of the invention generally contemplate the heating film being used to heat the substance in the container but cases arise in which the substance is stored in the container and is ultimately to be dissolved or diffused into another substance to be heated by the film. An example is a beverage made from a concentrate. For such cases the heating film or part of it is formed into a sachet or bag in which the substance, e.g. a concentrate is packed and the slots in the pattern (or other apertures if the pattern is not of the meander type) are closed either by an impervious cover or envelope (e.g. of polythene) which is removed at the time of use, or by an edible substance compatible with the beverage which is normally impervious but which is soluble in milk or water, e.g. gelatine or a sugar preparation. The sachet or bag (after removal of the cover or envelope if enclosed therein) is immersed in the liquid and the film used to heat the liquid, while the substance diffuses through the slots or apertures. The choice of a soluble covering enables the time that diffusion commences to be regulated, while the rate of diffusion can be varied by choosing the area of the slots or apertures which are freed. Any excess area of slot can be covered by a layer which remains impervious.

Reverting now to the containers it is possible in some cases to make the container of the heating film itself and the film may be no more than a laminate of patterned foil e.g. aluminium foil and a paper or a plastic film. The choice of plastic film depends—apart from the usual packing considerations (compatibility with contents, vapour-permeability, price strength, facility for decoration, etc.)—on the temperature endurance of the particular plastic. When the intended heating temperature is low enough it permits the use of ordinary polythene film, polyvinylchloride, regenerated cellulose (cellophane) and even paper. Where higher temperature plastic films are needed, irradiated or high density polyethylene, polypropylene, polycarbonate, or polyester film is chosen while others may become available in the course of time.

If, for instance, a bag is made from this two-layer material, the aluminium foil is first patterned by any known convenient process, such as that described in my application Serial No. 165,736, filed January 12, 1962, or by punching slots. The pattern provides one (or more) continuous aluminium line(s) with very small gaps between them and covers nearly the whole area of the bag except for certain strips which are not connected with the continuous heater line(s). As shown by way of example in FIGURE 50 the continuous lines are produced by rows of apertures 187 and long slots 188. Consideration will show that this results in a number of meandering paths in parallel being produced between a terminal area 189 and a terminal area 191 of each portion of the patterned area. Between each such patterned area and not connected with the continuous heater lines are transverse strips 192 which form edge reinforcements on the fold when the material is folded into a bag. It will be understood that a repeating pattern is produced on a continuous length of insulating support 193 which is severed at the dot lines and folded at the dot and dash lines. Another strip 194 also not connected with the continuous lines is arranged along each edge. This is a narrow line with many holes or notches to increase its resistance. When the material is folded into a bag, the longitudinal edges are folded over and these fine line patterns 194 are connected to a suitable voltage supply to provide the necessary sealing heat. The overlaid plastic film edges weld together in the areas of the gaps between, within, and around the metal lines 194. The hot metal lines themselves also become adherent to the plastic. This procedure is, of course, only possible where the heat-sealing temperature lies well above the designed maximum operating temperature of the bag and where the seal is not affected by operating temperature.

With the particular arrangement shown, when the bag is completed there are two separate patterns, one on each side, each having two terminal areas. A device similar to that shown in FIGURE 4 may be used but with each of the two rubber packings 23 carrying two contacts extending over a little less than half length. The foil contacts opposite one another on the two rubber backings will be of the same polarity so that when the device is closed without a bag in position, there is no short-circuiting.

The pattern of the continuous heater line or lines is usually a meander with very small gaps, wide and short areas covering nearly the whole area available as shown in FIGURE 50. It can however be so shaped as to form an ornament, sign or lettering, or take part in the decorative treatment of the package. The anodizing and colouring facilities available for aluminium can be utilized to enhance this effect, and decorative printing can be combined with printing of acid resists for etching for the same purpose. The ink only needs to be cleaned off the terminals.

It is also possible to imprint the aluminium foil on the side bonded to the plastic film prior to the laminating or coating process. The term coating refers for example to the plastic film being made by lacquering the aluminium foil. The gaps in the pattern can be hidden to some extent for instance by overprinting the gaps with an ink of the colour of the reverse side of the foil.

The aluminium foil pattern can be on the inside or on the outside of the package. To reduce damage in transport it is advisable to provide a protective coating by varnishing or bonding of a plastic, usually transparent, film over it. In this case the heating film has become by association or incorporation a three layer material, not counting the layer or layers of ink for foil patterning or decoration.

In the structure plastic film—foil pattern-plastic film—there can be substituted for the outward plastic film practically any insulating material suitable for the package, and of the desired thermal insulation and mechanical properties. Thus plastic foam, papier mache, corrugated paper, cellular cardboard, crate material, etc. can be used as the outside layer. Alternatively and based on conventional packaging considerations such material or a metal foil or other metal wall may be stuck to the plastic film while the foil pattern can remain without a protective plastic film on the other side.

The pattern of the heating film may incorporate a safety device by which the circuit is broken when the desired temperature or a temperature reckoned dangerous is reached. There may be a fuse for instance in the foil pattern of the heating film itself. Such provision is made by narrowing the width of the continuous line at a convenient place in the film so that this part of the pattern constitutes a fuse which will blow at a certain current. Another way to provide a fuse is to connect a tiny link in the pattern which consists of two pieces of foil under tension held together with a solder or other fusible adhesive. The tension may be that which is present in any event in such an article as a filled bag of flexible heating film or by development of vapour pressure during heating of the foodstuff. If the solder or fusible adhesive has a low melting point it will also break on being overheated by any means.

As above mentioned the voltage on which the heating films incorporated in the containers are designed to operate may advantageously be the same as that of the usual motor car battery, namely 12 volts. For use on aircraft they may be designed to operate at 24 to 28 volts as supplies at this voltage are usually available. Provision can however be made in some cases to operate them for a very short time (to give a high heat shock) at about 48 volts, but always remaining below the voltage level which it would be dangerous to touch and below the voltage which is subject to the insulation and earthing regulations of various electricity authorities.

Where temperature control can be provided for either by an automatic cut out or by the attention of the user, provision for a very brief heat shock at a two to four times higher voltage can be made by a time switch. For the private consumer a small transformer of large surface area capable of sustaining a high short-time overload is sufficient for heating up pre-cooked food packs, canisters or beverages, but for public eating places, vending machines or for the cooking facilities described earlier a larger transformer is required. In these installations the maximum voltage is supplied to the heating film first while the food pack is on a tray or held inside the vending machine. The temperature of the package is sensed either by surface thermometric elements in the tray or holding device or by the heating film itself. The sensing actuates further controls, such as reduction of the voltage to the value for merely keeping the food at the temperature reached or desired, rejection of packages for faults in heating film, switching on of a signal lamp for "ready, take out" or giving a warning. The installation may have several channels to heat several food packages simultaneously. Coin operated vending machines with only one channel can however have several terminals or hot plates where food packs are kept warm while slowly emptied by the consumer.

A transformer for use by the general public or in a restaurant is preferably designed to be like a flat box so that it can be used as warmplate and lends itself to artistic styling and use as a centre piece on a dining table. It is switched on the primary side and has lamps to show that it is "on." It may have a switch to reduce the 12 volts output to a "keep food warm" level.

Various forms of package suitable for food stuffs are described above, particularly canisters and boxes of fibrous materials. If food is to be served on trays as is convenient particularly on vehicles such as trains, and in aircraft and also in camps and places of entertainment, or again in the home when television is being viewed, it is desirable that the food should be contained in a container having sufficient stiffness as a support while the food is being defrozen and reheated. Such a container may be arranged to fit into a recess in a tray. The heating film can be embedded in the food and easily be removed when the food is hot either by the consumer or the person who serves him. As the container has to contain the hot, often liquid food, it should have a high degree of rigidity. At present aluminium foil pressings are often used as individual food packs to permit the heating of the food while in the pack on the hotplate or in an oven and in some cases to render it possible to serve the food in these pressings. One of the disadvantages of these foil packs is that they are usually not rigid enough for food which is soft or liquid when hot. The cause of this shortcoming is that they must be good heat conductors and not too thick for reasons of cost and weight, and the provision of stiffening sections by pressing the foil has its limits.

A higher degree of stiffness of the individual food package which has to contain the hot, often liquid, food is desirable particularly if the food is heated and served in it, while permitting easy access to the contents. The present invention provides for this for example by means of containers as described above with reference to FIG-URES 23 to 32. The invention provides further forms of tray packs which also facilitate their filling while they are on a conveyor line without the conveyor line itself needing any special construction. Since these containers are like shallow boxes with often thin top and bottom covers but fairly rigid side walls they can be held in any order on a conveyor belt merely by exerting a slight squeeze on them through side rails or by soft elastic bands running between the rows of containers. The heating film covers all walls or only top and bottom wall of the container. The part of the heating film which subsequently forms the top cover of the box is simply folded back over the front and/or back side walls, while the container is being filled. To prevent food drippings from soiling the other sides of the pack a guard strip is fixed above the line of these other side walls. The superiority of the tray packs according to the invention over present day foil packs is made possible because the present invention provides a hot film surface which is the heat creating element itself and which can be in close contact with the food. The container need therefore not be of good heat conductivity throughout its thickness. Thus it can be made from or incorporate laminated structural material of high stiffness but low weight. This material is generally sandwiched between two flat films or foils of which the inner film may be or may support the thin plastic heating film with the metallic pattern and the outer a decorated paper, plastic film or metallic foil. Between and to these thin, smooth skins a thick, airy, buckling-resisting layer is stuck consisting for instance of corrugated paper or cardboard, stiff plastic foam, honeycomb construction, papier mache or a similar, cheap and lightweight stiffening filler. There is no need to make the whole package from this laminated material. It is, for instance, sufficient to have it on the four low side walls of shallow box or tray-like food packs, thus constituting a stiff frame of the stressed skin type, while the large bottom area or top and bottom areas are formed only by the heating film proper. Thus as shown for example in FIGURES 51 and 52, the sides of the container are made of corrugated paper 195 having the usual base paper 196 and another paper 197 stretched over and secured to the crests of the corrugations so that a composite material of the stressed skin type results which is stiff in planes normal to the corrugations as well as along the corrugations which are here set perpendicular to the top and bottom of the container. The heating film 198 forms the top and bottom, with tabs 199 carrying the terminal areas projecting sideways and this assembly containing the food 201 is contained in a usual cardboard box 202 recessed at the bottom to protect the film and contents. Such packs can be safely stacked on one another and can be connected in circuit when so stacked.

Containers of this character are particularly useful on aircraft on which an ample supply of direct current at a voltage of about 28 volts is often available. The packages may be supported in trays or tray inserts having moulded compartments serving as armchair trays on which the meal is served. For defreezing and heating up quickly a large quantity of individual food packs supplied in bulk boxes or on stacks of trays or tray inserts the total contents of each bulk box or stack of trays is divided into two lots and the terminals of all food packs are connected in parallel within each lot. To keep the food only warm the collective terminals of two (or more) lots of food packs are connected in series. The heating films of the individual packages are designed for the aircraft's supply of 28 volts and have three terminal areas and two meander paths each for example as described with reference to FIGURES 33 and 34 so that they can individually be connected in series or parallel. The switching operations are controlled by conventional temperature sensitive devices or by timing. The described heating of the packs in their bulk boxes or trays and the series-parallel switching enables a steep heating curve to be obtained and the food to be kept warm without an oven or hot box. The speed of heating enables hot meals to be served from deep frozen packs even on short trips.

The same scheme of serving heated food on trays can be applied in such spaces as on motor cars and coaches and in trains and also in hospitals, canteens, camps, schools, factories and so forth. For all these purposes as well as for aircraft, the tray may be provided with means for connection to the low voltage electricity supply and preferably also with one or more small lamps for indicating that the heating is "on" or for throwing soft light on the tray. The latter is particularly desirable when eating in dark places (television watchers' trays, motorists' trays, night meals in sickroom, camps etc.). The tray on which the food is served may in this case be a permanent washable tray.

I claim:

1. A dispensable container containing a substance to be heated while in the container in which the substance is in contact with at least part of the inside surface of the container and the wall of the container incorporates a thin low voltage heating film having a surface pattern presenting a resistive electrical path between at least two terminals to which access can be obtained for connection to a supply without removing the substance from the container, the pattern being so dimensioned that when connected to a supply at a controlled low voltage the difference between the heat conducted into the substance in the container from any area of the surface of the heating film is held to a value such that the temperature of the exterior surface of the container does not rise to a temperature substantially above the temperature to which the substance is raised during the heating period, and means which at least during the time the film is connected to the supply to hold the substance in the container in gap-free heat-conductive pressure contact with the heating film over at least the major part of the portion of its surface which is loaded at more than 4 watts per square inch.

2. A dispensable container containing a substance to be heated while in the container in which the substance is in contact with at least part of the inside surface of the container and the wall of the container incorporates a thin low voltage heating film having a surface pattern presenting a resistive electrical path between at least two terminals to which access can be obtained for connection to a supply without removing the substance from the container, the pattern being so dimensioned that when connected to a supply at a controlled low voltage the difference between the heat conducted into the substance in the container from any area of the surface of the heating film is held to a value such that the temperature of the exterior surface of the container does not rise to a temperature substantially above the temperature to which the substance is raised during the heating period, a wall having a thin, impervious and heat resistant inner layer, and means ensuring intimate heat-conductive contact of the heating film with the outside of said layer at least when the film is connected to the supply, said last-mentioned means ensuring intimate contact being an adhesive bonding the film to said layer, and said adhesive forming a viscous fluid which wets the heating film at least at the operating temperature of the heating film.

3. A dispensable container containing a substance to be heated while in the container in which the substance is in contact with at least part of the inside surface of the container and the wall of the container incorporates a thin low voltage heating film having a surface pattern presenting a resistive electrical path between at least two terminals to which access can be obtained for connection to a supply without removing the substance from the container, the pattern being so dimensioned that when connected to a supply at a controlled low voltage the difference between the heat conducted into the substance in the container from any area of the surface of the heating film is held to a value such that the temperature of the exterior surface of the container does not rise to a temperature substantially above the temperature to which the substance is raised during the heating period, a wall having a thin, impervious and heat resistant inner layer, and means ensuring intimate heat-conductive contact of the heating film with the outside of said layer at least when the film is connected to the supply, said last-mentioned means ensuring intimate contact comprising means for mechanically stressing the film in tension whereby it is pressed against said wall.

4. A dispensable container containing a substance to be heated while in the container in which the substance is in contact with at least part of the inside surface of the container and the wall of the container incorporates a thin low voltage heating film having a surface pattern presenting a resistive electrical path between at least two terminals to which access can be obtained for connection to a supply without removing the substance from the container, the pattern being so dimensioned that when connected to a supply at a controlled low voltage the difference between the heat conducted into the substance in the container from any area of the surface of the heating film is held to a value such that the temperature of the exterior surface of the container does not rise to a temperature substantially above the temperature to which the substance is raised during the heating period, a wall having a thin, impervious and heat resistant inner layer, and means ensuring intimate heat-conductive contact of the heating film with the outside of said layer at least when the film is connected to the supply, said last-mentioned means ensuring intimate contact comprising means for mechanically stressing the film in tension whereby it is pressed against the wall, and the heating film being longer than the circumference of said wall, the extra length being at most under a lower electrical loading than the part in contact with said wall and the mechanical stress being applied by means engaging the extra length.

5. A dispensable container containing a substance to be heated while in the container in which the substance is in contact with at least part of the inside surface of the container and the wall of the container incorporates a thin low voltage heating film having a surface pattern presenting a resistive electrical path between at least two terminals to which access can be obtained for connection to a supply without removing the substance from the container, the pattern being so dimensioned that when connected to a supply at a controlled low voltage the difference between the heat conducted into the substance in the container from any area of the surface of the heating film is held to a value such that the temperature of the exterior surface of the container does not rise to a temperature substantially above the temperature to which the substance is raised during the heating period, a wall having a thin, impervious and heat resistant inner layer, and means ensuring intimate heat-conductive contact of the heating film with the outside of said layer at least when the film is connected to the supply, said last-mentioned means ensuring intimate contact comprising means for mechanically stressing the film in tension whereby it is pressed against the wall, and the heating film being longer than the circumference of said wall, the extra length being at most under a lower electrical loading than the part in contact with said wall and the mechanical stress being applied by means engaging the extra length, and at least one layer of the heating film forming a closed loop.

6. A dispensable container containing a substance to be heated while in the container in which the substance is in contact with at least part of the inside surface of the container and the wall of the container incorporates a thin low voltage heating film having a surface pattern presenting a resistive electrical path between at least two terminals to which access can be obtained for connection to a supply without removing the substance from the container, the pattern being so dimensioned that when connected to a supply at a controlled low voltage the difference between the heat conducted into the substance in the container from any area of the surface of the heating film is held to a value such that the temperature of the exterior surface of the container does not rise to a temperature substantially above the temperature to which the substance is raised during the heating period, and the resistive path of the surface pattern comprising an alloy containing about 3 percent manganese, traces of other metals and the balance aluminium.

References Cited by the Examiner

UNITED STATES PATENTS

| | | | |
|---|---|---|---|
| 2,522,810 | 9/1950 | Bailey | 339—200 |
| 2,532,014 | 11/1950 | Davis | 219—383 |
| 2,573,972 | 11/1951 | Holland | 339—266 |
| 2,696,776 | 12/1954 | McBean et al. | 99—356 |
| 2,767,100 | 10/1956 | Clarke | 99—171 |
| 2,844,695 | 7/1958 | McLean | 219—473 |
| 2,879,367 | 3/1959 | McLean | 219—385 |
| 2,935,930 | 5/1960 | Abrams | 99—356 |
| 2,990,286 | 6/1961 | Clarke et al. | 99—171 |
| 3,210,199 | 10/1965 | Schlaf | 219—385 X |

RICHARD M. WOOD, *Primary Examiner.*

RAYMOND N. JONES, *Examiner.*

R. F. STAUBLY, *Assistant Examiner.*